US012794609B2

(12) United States Patent
Wu

(10) Patent No.: US 12,794,609 B2
(45) Date of Patent: Nov. 10, 2026

(54) SYNCHRONIZATION SIGNAL BLOCK (SSB) TRANSMISSION METHOD AND TERMINAL DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 524 days.

(21) Appl. No.: 18/070,279

(22) Filed: Nov. 28, 2022

(65) Prior Publication Data

US 2023/0121866 A1 Apr. 20, 2023

Related U.S. Application Data

(63) Continuation of application No. PCT/CN2020/093014, filed on May 28, 2020.

(51) Int. Cl.

| | |
|---|---|
| ***H04L 5/00*** | (2006.01) |
| ***H04L 1/1812*** | (2023.01) |
| ***H04W 74/08*** | (2009.01) |

(52) U.S. Cl.

CPC .......... *H04L 5/0007* (2013.01); *H04L 1/1812* (2013.01); *H04L 5/0048* (2013.01); *H04W 74/08* (2013.01)

(58) Field of Classification Search

None

See application file for complete search history.

(56) References Cited

U.S. PATENT DOCUMENTS 12,035,320 B2 * 7/2024 Zhang .................. H04W 48/16
2018/0234967 A1 * 8/2018 Kim ....................... H04W 4/40
(Continued)

FOREIGN PATENT DOCUMENTS

CN 107528682 A 12/2017
CN 110278599 A 9/2019
(Continued)

OTHER PUBLICATIONS

Nokia, "Potential Solutions and Techniques For NR Unlicensed," 3GPP TSG RAN WG1 Meeting #92, R1-1802526, Athens Greece, Feb. 26-Mar. 2, 2018, 11 pgs.
(Continued)

*Primary Examiner* — Jeffrey M Rutkowski
*Assistant Examiner* — Mehedi S Aley
(74) *Attorney, Agent, or Firm* — Morgan, Lewis & Bockius LLP

(57) ABSTRACT

Embodiments of the present invention provide a synchronization signal block (SSB) transmission method, a terminal device, and a computer-readable storage medium, enabling SSB transmissions to continue even after an LBT operation performed prior to an SSB resource transmission has failed, and accordingly improving the performance of SSB detection. The method according to the embodiments of the present invention comprises: a terminal device performing channel detection on a first carrier on a shared spectrum, and determining the availability of at least one first time domain resource on the first carrier, wherein each of the at least one first time domain resource is used to transmit a synchronization signal block.

15 Claims, 7 Drawing Sheets

(56) References Cited

U.S. PATENT DOCUMENTS

| | | | | |
|---|---|---|---|---|
| 2019/0215790 | A1* | 7/2019 | Kim | H04L 5/0048 |
| 2019/0306923 | A1* | 10/2019 | Xiong | H04L 27/261 |
| 2019/0327696 | A1* | 10/2019 | Oh | H04W 56/001 |
| 2020/0163037 | A1* | 5/2020 | Zheng | H04L 5/0048 |
| 2022/0053488 | A1* | 2/2022 | Sun | H04W 48/12 |

FOREIGN PATENT DOCUMENTS

| | | | |
|---|---|---|---|
| KR | 20170127634 | A | 11/2017 |
| WO | WO2020033086 | A1 | 2/2020 |

OTHER PUBLICATIONS

Guangdong OPPO Mobile Telecommunications Corp. Ltd., International Search Report and Written Opinion, PCT/CN2020/093014, Feb. 25, 2021, 43 pgs.

Guangdong OPPO Mobile Telecommunications Corp., Ltd., EP20937862.9, Extended European Search Report, Jun. 28, 2023, 9 pgs.

Guangdong Oppo Mobile Telecommunications Corp., Ltd., CN202411522751.X, First Office Action, dated Aug. 15, 2026, 26 pgs.

* cited by examiner

SYNCHRONIZATION SIGNAL BLOCK (SSB) TRANSMISSION METHOD AND TERMINAL DEVICE

CROSS-REFERENCE TO RELATED APPLICATIONS

The present application is a continuation application of PCT Application No. PCT/CN2020/093014, entitled "SYNCHRONIZATION SIGNAL BLOCK (SSB) TRANSMISSION METHOD AND TERMINAL DEVICE" filed on May 28, 2020, the entire disclosures of which is incorporated herein as a part of the present application for all purposes.

TECHNICAL FIELD

The present disclosure relates to the field of communication, and in particular, to a method for transmitting a Synchronization Signal Block (SSB), a terminal device, and a computer-readable storage medium.

BACKGROUND

In the evolution of a SideLink (SL) system, it is possible to support device-to-device transmission on a shared spectrum. In this case, a terminal device needs to send a Synchronization Signal Block (SSB) on the shared spectrum, where the SSB may include a Sidelink Synchronization Signal/Physical Sidelink Broadcast Channel Block (S-SS/PSBCH block or S-SSB). However, on the shared spectrum, if the terminal device fails in Listen Before Talk (LBT) before sending a SSB resource, the terminal device cannot perform SSB transmission, thereby affecting SSB detection performance.

SUMMARY

Embodiments of the present disclosure provide a method for transmitting a Synchronization Signal Block (SSB), a terminal device, and a computer-readable storage medium, which are used to continue performing LBT on other SSB resources when LBT fails before one SSB resource is to be sent, so as to confirm whether SSB transmission can be performed, thereby improving a transmission opportunity of SSB on a shared spectrum.

A first aspect of embodiments of the present disclosure provides a method for transmitting a Synchronization Signal Block (SSB). The method may include: performing, by a terminal device, channel detection on a first carrier on a shared spectrum to determine availability of at least one first time domain resource on the first carrier. Each of the at least one first time domain resource is used to transmit the synchronization signal block.

In some embodiments, the performing, by the terminal device, the channel detection on the first carrier on the shared spectrum may include: performing, by the terminal device, the channel detection on the first carrier on the shared spectrum by using a first channel access mode. The first channel access mode includes at least one of a Type1 channel access mode, a Type2A channel access mode, a Type2B channel access mode, and a Type2C channel access mode.

In some embodiments, the at least one first time domain resource includes at least two first time domain resources. The performing, by the terminal device, the channel detection on the first carrier on the shared spectrum to determine availability of the at least one first time domain resource on the first carrier may include:

- if a first first time domain resource of the at least one first time domain resource transmits the synchronization signal block, performing, by the terminal device, the channel detection by using at least one of the Type2A channel access mode, the Type2B channel access mode, and the Type2C channel access mode to determine availability of at least one other first time domain resource of the at least one first time domain resource other than the first first time domain resource; or
- if the first first time domain resource of the at least one first time domain resource does not transmit the synchronization signal block, performing, by the terminal device, the channel detection by using the Type1 channel access mode or the Type2A channel access mode to determine availability of at least one other first time domain resource of the at least one first time domain resource other than the first first time domain resource.

In some embodiments, the first first time domain resource transmitting the synchronization signal block may include: sending, by the terminal device, the synchronization signal block through the first first time domain resource, or detecting, by the terminal device, existence of the synchronization signal block through the first first time domain resource.

Alternatively, the first first time domain resource not transmitting the synchronization signal block may include: sending, by the terminal device, the synchronization signal block through the first first time domain resource, and detecting, by the terminal device, existence of the synchronization signal block through the first first time domain resource.

In some embodiments, the performing, by the terminal device, the channel detection on the first carrier on the shared spectrum to determine availability of the at least one first time domain resource on the first carrier may include: performing, by the terminal device, the channel detection on the first carrier by using the Type1 channel access mode or the Type2A channel access mode to determine availability of a first first time domain resource of the at least one first time domain resource.

In some embodiments, the at least one first time domain resource includes at least two first time domain resources. The performing, by the terminal device, the channel detection on the first carrier on the shared spectrum by using the first channel access mode to determine availability of the at least one first time domain resource on the first carrier may include: performing, by the terminal device, the channel detection on the first carrier by using at least one of the Type2A channel access mode, the Type2B channel access mode, and the Type2C channel access mode to determine availability of at least one other first time domain resource of the at least one first time domain resource other than the first first time domain resource.

In some embodiments, information of the at least one first time domain resource is preset or configured by a first device. The information of the at least one first time domain resource includes at least one of a time domain position, a frequency domain position and a number of the at least one first time domain resource.

In some embodiments, the first device includes a network device or a controlling terminal device.

In some embodiments, the at least one first time domain resource includes at least two first time domain resources. The at least two first time domain resources have the same Quasi-Co-Location (QCL) relationship. Alternatively, the at least two first time domain resources are used to transmit synchronization signal blocks with the same QCL relationship, or the at least two first time domain resources are used to transmit synchronization signal blocks with the same index.

In some embodiments, the at least one first time domain resource includes at least two first time domain resources. The at least two first time domain resources do not have the same QCL relationship. Alternatively, the at least two first time domain resources are used to transmit synchronization signal blocks without the same QCL relationship, or the at least two first time domain resources are used to transmit synchronization signal blocks with the same index.

In some embodiments, the at least one first time domain resource includes at least two first time domain resources. At least two adjacent first time domain resources included in the at least two first time domain resources are consecutive in time domain. Or, a first interval in time domain between two adjacent first time domain resources of the at least two first time domain resources includes N symbols, where N is a positive integer. Or, a second interval in time domain between two adjacent first time domain resources of the at least two first time domain resources includes M slots, where M is a positive integer.

In some embodiments, a value of N is determined according to a subcarrier spacing of the synchronization signal block.

In some embodiments, the N symbols are used by the terminal device to perform channel access using at least one of the Type2A channel access mode, the Type2B channel access mode, and the Type2C channel access mode. Alternatively, the N symbols are used by the terminal device to perform receiving-to-transmitting conversion or transmitting-to-receiving conversion.

In some embodiments, the at least one first time domain resource is a resource included in at least one slot, and each of the at least one slot includes one first time domain resource.

In some embodiments, the first time domain resource occupies symbols 0 to 12 in a slot in time domain. Or, the first time domain resource occupies symbols 1 to 13 in a slot in time domain. Or, the first time domain resource occupies symbols 1 to 12 in a slot in time domain.

In some embodiments, if the first time domain resource does not occupy symbol 0 in a slot in time domain, the symbol 0 is used to repeatedly transmit symbol 1; or the symbol 0 is used to transmit a Cyclic Prefix (CP) extension part of the symbol 1; or the symbol 0 is used by the terminal device to perform Automatic Gain Control (AGC) adjustment.

In some embodiments, if the first time domain resource does not occupy symbol 13 in a slot in time domain, the symbol 13 is used to transmit a Cyclic Prefix (CP) extension part of symbol 0 in a next slot; or the symbol 13 is used by the terminal device to perform Automatic Gain Control (AGC) adjustment; or the symbol 13 is used by the terminal device to perform receiving-to-transmitting conversion or transmitting-to-receiving conversion.

In some embodiments, the at least one first time domain resource is a resource included in at least one slot, and each of the at least one slot includes P first time domain resources, where P is a positive integer greater than or equal to 2.

In some embodiments, two adjacent first time domain resources of the P first time domain resources are consecutive in time domain.

In some embodiments, a third interval in time domain between two adjacent first time domain resources of the P first time domain resources includes Q symbols, where Q is a positive integer.

In some embodiments, the Q symbols are used by the terminal device to perform channel access using at least one of the Type2A channel access mode, the Type2B channel access mode, and the Type2C channel access mode. Alternatively, the N symbols are used by the terminal device to perform receiving-to-transmitting conversion or transmitting-to-receiving conversion.

In some embodiments, the Q symbols are used by the terminal device to transmit a Cyclic Prefix (CP) extension part of a first symbol after the Q symbols.

In some embodiments, the method may further include: if it is determined by the terminal device according to the channel detection that at least one first time domain resource of the at least one first time domain resource is available, sending, by the terminal device, the synchronization signal block through at least one available first time domain resource.

In some embodiments, the sending, by the terminal device, the synchronization signal block through the at least one available first time domain resource may include:

- sending, by the terminal device, the synchronization signal block on each of the at least one available first time domain resource; or
- sending, by the terminal device, the synchronization signal block on one of the at least one available first time domain resource; or
- if the at least one available first time domain resource includes S available first time domain resources, sending, by the terminal device, S synchronization signal blocks on the S available first time domain resources, where at least two of the S synchronization signal blocks do not have the same QCL relationship, and S is an integer greater than or equal to 2.

In some embodiments, the synchronization signal block includes at least one of a primary synchronization signal, a secondary synchronization signal, and a physical broadcast channel.

A second aspect of embodiments of the present disclosure provides a terminal device, capable of improving a transmission opportunity of S-SSB on a shared spectrum. This can be implemented by hardware or by executing corresponding software by hardware. The hardware or software includes one or more modules corresponding to the functions described above.

Another aspect of embodiments of the present disclosure provides a terminal device, including: a memory storing executable program codes; and a processor coupled to the memory. The processor is configured to call the executable program codes stored in the memory to perform the method described in the first aspect of embodiments of the present disclosure.

Yet another aspect of embodiments of the present disclosure provides a computer-readable storage medium, including instructions. The instructions, when run on a computer, cause the computer to perform the method described in the first aspect of the present disclosure.

Yet another aspect of embodiments of the present disclosure provides a computer program product including instructions. The instructions, when run on a computer, cause the computer to perform the method described in the first aspect of the present disclosure.

Yet another aspect of embodiments of the present disclosure provides a chip. The chip is coupled to a memory in a terminal device, so that the chip calls program instructions stored in the memory when running, thereby rendering the terminal device to perform the method described in the first aspect of the present disclosure.

In the technical solutions provided by embodiments of the present disclosure, the terminal device performs the channel detection on the first carrier on the shared spectrum to determine availability of at least one first time domain resource on the first carrier. Each of the at least one first time domain resource is used to transmit the synchronization signal block. If the terminal device fails to perform LBT before one SSB resource, the terminal device can perform LBT for another SSB resource, and perform SSB transmission through the SSB resource after LBT succeeds, thereby improving the transmission opportunity of SSB.

DETAILED DESCRIPTION

Figure 1A:
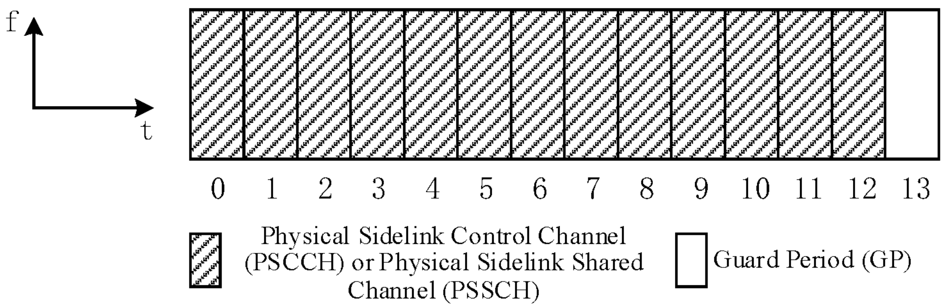
FIG. 1A is a schematic diagram of a terminal sending or receiving data in a D2D system.

The technical solutions in embodiments of the present disclosure will be described below in combination with the drawings in embodiments of the present disclosure. Obviously, the described embodiments are only part of embodiments of the present disclosure, rather than all the embodiments. Based on embodiments in the present disclosure, all other embodiments acquired by a person of skill in the art without creative work shall fall within the protection scope of the present disclosure.

The following is a brief description of some terms involved in the present disclosure.

At present, researches on the next-generation (mobile communication) system (New radio (NR) system) mainly consider two frequency ranges of Frequency Range 1 (FR1) and Frequency Range 2 (FR2), and frequency domain ranges included in FR1 and FR2 are shown in Table 1. It should be understood that embodiments of the present disclosure may be applied to FR1 and FR2, and may also be applied to other frequency ranges, such as a frequency range from 52.6 GHz to 71 GHz, or a frequency range from 71 GHz to 100 GHz, which is not limited in the present disclosure.

TABLE 1

| frequency range definition | corresponding range |
|---|---|
| FR1 | 410 MHz-7.125 GHz |
| FR2 | 24.25 GHz-52.6 GHz |

1. Shared Spectrum

The shared spectrum includes an unlicensed spectrum. The unlicensed spectrum is a spectrum that can be used for communication of a communication device divided by countries and regions. That is, communication devices in different communication systems can use a spectrum as long as they meet regulatory requirements set by the countries or the regions on the spectrum, and there is no need to apply for a proprietary spectrum authorization from the government.

In order to allow individual communication systems that use the unlicensed spectrum for wireless communication to coexist amicably on this spectrum, some countries or regions have stipulated some legal requirements that must be met when the unlicensed spectrum is used. For example, a communication device follow a “Listen-Before-Talk (LBT)” principle. That is, the communication device needs to perform channel detection before transmitting a signal on a channel of the unlicensed spectrum. Only when the channel detection result indicates that the channel is idle, the communication device performs signal transmission. If the channel detection result by the communication device on the channel of the unlicensed spectrum indicates that the channel is busy, the communication device cannot perform signal transmission. For another example, in order to ensure fairness, in one transmission, the time duration for the communication device to use an unlicensed spectrum channel for signal transmission should not be longer than a certain duration. For still another example, in order to avoid that power of the signal transmitted on the unlicensed spectrum channel is too large, which will affect a transmission of other important signals on the channel, the communication device needs to follow a limitation of not exceeding a maximum power spectrum density when using the unlicensed spectrum channel for signal transmission.

2. Device to Device (D2D)/Vehicle to Everything (V2X)

D2D communication is a technology based on sidelink (SL) transmission. Different from the traditional cellular system in which communication data is received or sent through a base station, a D2D system adopts a device-to-device direct communication, thereby having higher spectral efficiency and lower transmission delay.

In the D2D system, a terminal sends sidelink data, and other surrounding terminals can receive the sidelink data. Terminals that send data at different times may be different. Accordingly, the terminal sends data in a first slot, and needs to receive data sent by other terminals in a second slot. Thus, the last symbol of each slot is used as a Guard Period (GP), no data is sent on this symbol, and it is used by the terminal to perform receiving-to-transmitting conversion (or transmitting-to-receiving conversion). As shown in FIG. 1A, it is a schematic diagram of a terminal of a D2D system sending or receiving data.

3. Synchronization Signal/PBCH Block (SSB) Pattern in the Next-Generation (Mobile Communication System) (New Radio (NR) System)

In the NR system, a Synchronization Signal/Physical Broadcast Channel Block (SSB or SS/PBCH block) pattern supported by FR1 includes three cases (Case A, Case B, Case C), and a SSB pattern supported by FR2 include two cases (Case D, Case E). One SSB transmission opportunity may include one or more SSBs, one SSB includes four symbols in time domain, and transmission of a group of SSBs should be completed within one half frame (5 ms). Assuming an index of a first symbol in a first slot in one half frame is symbol 0.

(1) Case A-15 kHz Subcarrier Spacing:

1) the index of the first symbol of the SSB includes {2,8}+14*n;

2) For the non-shared spectrum:

① the carrier frequency is less than or equal to 3 GHz, n=0,1;

② the carrier frequency in FR1 is greater than 3 GHz, n=0, 1, 2, 3;

3) For the shared spectrum, n=0, 1, 2, 3, 4.

(2) Case B-30 kHz Subcarrier Spacing:

1) the index of the first symbol of the SSB includes {4,8,16,20}+28*n;

① the carrier frequency is less than or equal to 3 GHz, n=0;

② the carrier frequency in FR1 is greater than 3 GHz, n=0,1.

(3) Case C-30 kHz Subcarrier Spacing:

1) the index of the first symbol of the SSB includes {2,8}+14*n;

2) For the non-shared spectrum and belonging to paired spectrums (such as a Frequency Division Duplex (FDD) scenario);

① the carrier frequency is less than or equal to 3 GHz, n=0,1;

② the carrier frequency in FR1 is greater than 3 GHz, n=0, 1, 2, 3;

3) For the non-shared spectrum and belonging to non-paired spectrums (such as a Time Division Duplex (TDD) scenario);

① the carrier frequency is less than or equal to 2.4 GHz, n=0,1;

② the carrier frequency in FR1 is greater than 2.4 GHz, n=0, 1, 2, 3.

Figure 1B:
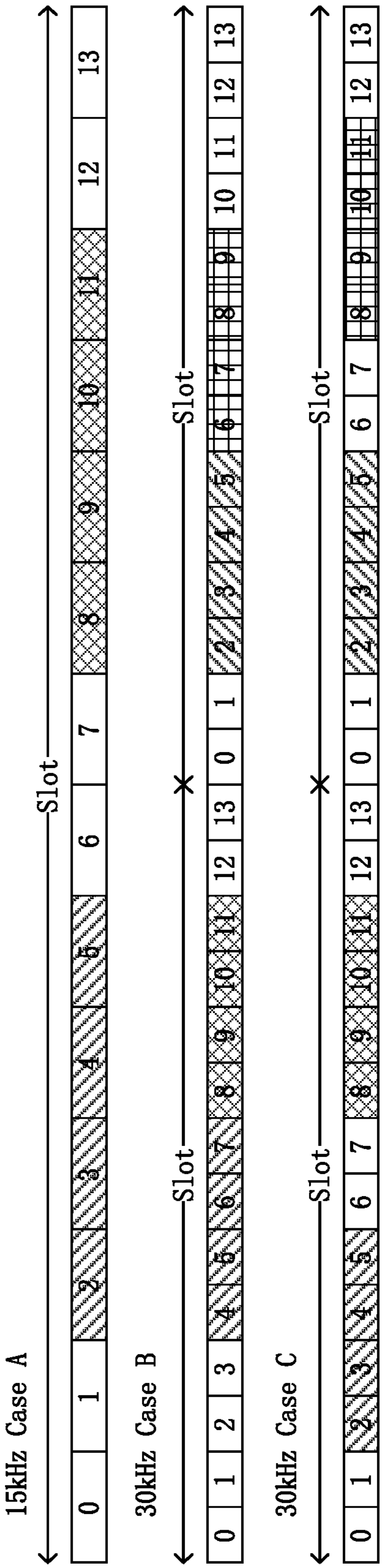
FIG. 1B is a schematic diagram of some SSB patterns for FR1 under different cases in an NR system.

As shown in FIG. 1B, it is a schematic diagram of some SSB patterns for FR1 under different cases in a NR system.

4) For the shared spectrum, n=0, 1, 2, 3, 4, 5, 6, 7, 8, 9.

(4) Case D-120 kHz Subcarrier Spacing:

1) the index of the first symbol of the SSB includes {4,8, 16,20}+28*n;

① For the carrier frequency in FR2, n=0, 1, 2, 3, 5, 6, 7, 8, 10, 11, 12, 13, 15, 16, 17, 18.

(5) Case E-240 kHz Subcarrier Spacing:

1) the index of the first symbol of the SSB includes {8,12,16,20,32,36,40,44}+56*n;

① for the carrier frequency in FR2, n=0, 1, 2, 3, 5, 6, 7, 8.

Figure 1C:
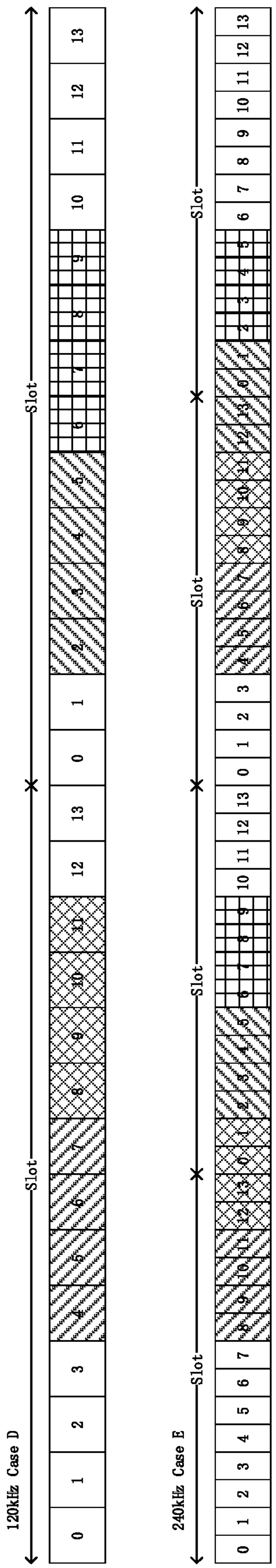
FIG. 1C is a schematic diagram of some SSB patterns for FR2 under different cases in an NR system.

As shown in FIG. 1C, it is a schematic diagram of some SSB patterns for FR2 under different situations in a NR system.

Figure 1D:
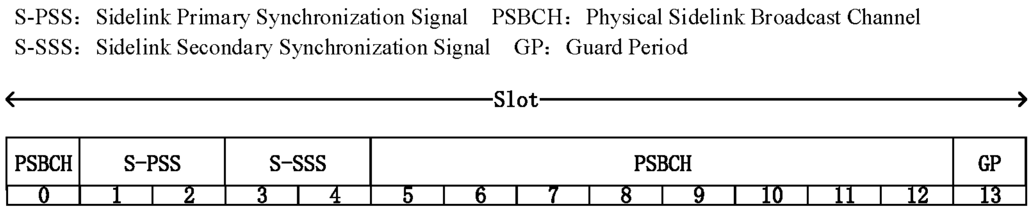
FIG. 1D is a schematic structural diagram of a S-SSB in a slot in an NR sidelink system.

4. NR Sidelink Synchronization Signal/Physical Sidelink Broadcast Channel Block (S-SS/PSBCH Block or S-SSB) Pattern In the NR sidelink system, a structure of the S-SSB is different from a structure of the SSB in the NR system. As shown in FIG. 1D, it is a schematic structural diagram of a S-SSB in a slot in an NR sidelink system. One slot includes one S-SSB, and one S-SSB includes eleven Resource Blocks (RBs) in frequency domain. In time domain, a Sidelink Primary Synchronization Signal (S-PSS) and a Sidelink Secondary Synchronization Signal (S-SSS) respectively include two symbols, and a Physical Sidelink Broadcast Channel (PSBCH) includes nine symbols, that is, symbol 0, symbols 5 to 12, and the last symbol is GP and used for receiving-to-transmitting conversion or transmitting-to-receiving conversion.

As an example, in time domain, a S-SSB transmission period is 160 ms, and the number of S-SSBs that can be included in each S-SSB transmission period is described as follows.

(1) For FR1

For the 15 kHz Subcarrier Spacing (SCS), {1}

For the 30 kHz SCS, {1, 2}

For the 60 kHz SCS, {1, 2, 4}

(2) For FR2

For the 60 kHz SCS, {1, 2, 4, 8, 16, 32}

For the 120 kHz SCS, {1, 2, 4, 8, 16, 32, 64}

Figure 1E:
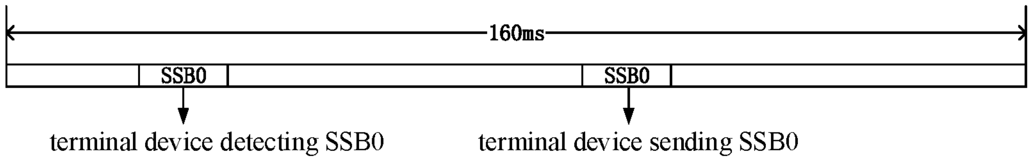
FIG. 1E is a schematic diagram of a terminal device sending a S-SSB in each S-SSB transmission period.

For one S-SSB, two S-SSB resources are included in one S-SSB transmission period. The terminal device performs S-SSB detection on one S-SSB resource, and after the S-SSB has been detected, the terminal device forwards the detected S-SSB on another S-SSB resource. FIG. 1E is a schematic diagram of a terminal device sending a S-SSB in each S-SSB transmission period.

5. Channel Access Scheme on the Shared Spectrum

On the shared spectrum, it should be noted that a mode in which a communication device obtains channel occupation may be a Load Based Equipment (LBE) channel access mode. That is, the communication device can perform LBT on the shared channel after a service arrives, and start transmission on the shared channel after LBT succeeds. Besides, the mode may also be a Frame Based Equipment (FBE) channel access mode. That is, the communication device periodically performs LBT on the shared channel. The FBE channel access mode may also be referred to as a semi-static channel access mode, and the LBE channel access mode may include a variety of different channel access schemes, as shown below. Generally, it can be considered that a Type2 channel access scheme has a higher priority than a Type1 channel access scheme.

Type1 Channel Access:

A channel detection mode of the communication device is multi-detection slot channel detection based on random backoff adjusted according to a contention window size. Specifically, under Type1 channel access, different Channel Access priority classes (CAPCs) may be comprised according to the priority class of the transmission service.

Type2A Channel Access

The channel detection mode of the communication device is to perform channel detection with a fixed detection slot length of 25 microseconds. Specifically, under the Type2A channel access, the communication device may perform channel detection of 25 microseconds before starting transmission, and then perform transmission after a successful channel detection.

Type2B Channel Access

The channel detection mode of the communication device is to perform channel detection with a fixed detection slot length of 16 microseconds. Specifically, under the Type2B channel access, the communication device may perform channel detection of 16 microseconds before starting transmission, and then perform transmission after a successful channel detection. In some embodiments, a size of a gap between a starting position of the transmission and an end position of a previous transmission is 16 microseconds.

Type2C Channel Access

The communication device performs transmission instead of channel detection. Specifically, under the Type2C channel access, the communication device may perform transmission directly after a gap ends, and a size of a gap between a starting position of the transmission and an end position of a previous transmission is less than or equal to 16 microseconds. In some embodiments, a length of the transmission in this channel access mode does not exceed 584 microseconds.

FBE Channel Access Mode a frame structure occurs periodically. A fixed frame period (a length of which does not exceed a preset value such as 10 ms), channel occupancy time (a length of which does not exceed 95% of the length of the fixed frame period), and an idle time (a length of which is at least 5% of the channel occupancy time, a minimum value of which is 100 μs, and which is located at an end of the fixed frame period) are included in one frame structure. A network device performs LBT in an idle time on a channel on the shared spectrum (which, for example, may be the channel detection with the fixed slot length). If the LBT is successful, the channel occupancy time in a next fixed frame period may be used for signal transmission. If the LBT is failed, the channel occupancy time in a next fixed frame period cannot be used for signal transmission. In other words, a channel resource which may be used by the communication device for service transmission occurs periodically.

During evolution of the SL system, it is possible to support device-to-device transmission on the shared spectrum. In this case, the terminal device needs to send SSB (such as S-SSB) on the shared spectrum. However, on the shared spectrum, if the terminal device fails in LBT before sending a SSB resource, the terminal device cannot perform the SSB transmission, thereby affecting SSB detection performance. Therefore, for the SSB transmission, a new enhancement scheme needs to be considered.

The technical solutions of embodiments of the present disclosure are applicable to various communication systems, for example, a global system of mobile communication (GSM) system, a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a Non-Terrestrial Networks (NTN) system, a universal mobile telecommunication system (UMTS), a wireless local area network (WLAN), a wireless fidelity (WiFi), a 5th-Generation (5G) communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Embodiments of the present disclosure can also be applied to these communication systems.

In some embodiments, a communication system of implementations according to embodiments of the present disclosure may be applied to a carrier aggregation (CA) scenario, a dual connectivity (DC) scenario, or a standalone (SA) network deployment scenario.

In some embodiments, the communication system in embodiments of the present disclosure may be applied to the unlicensed spectrum, and the unlicensed spectrum may also be considered as the shared spectrum. Alternatively, the communication system in embodiments of the present disclosure may also be applied to a licensed spectrum, and the licensed spectrum may also be considered the non-shared spectrum.

Embodiments of the present disclosure describe various embodiments in conjunction with a network device and a terminal device. The terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc.

The terminal device may be a station (ST) in WLAN. Alternatively, the terminal device may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing devices connected to a wireless modem, a vehicle-mounted device, a wearable device, or a terminal device in a next generation communication system, such as a terminal device in an NR network, or a terminal device in a future evolved Public Land Mobile Network (PLMN).

In embodiments of the present disclosure, the terminal device may be deployed on land, including indoor or outdoor, handheld, wearable, or vehicle-mounted. It may also be deployed on a water surface (such as on a ship). It may also be deployed in air (for example, on an aircraft, a balloon, a satellite, etc.).

In embodiments of the present disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, or a wireless terminal device in smart home.

By way of example and not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing, and shoes. The wearable device is a portable device that is worn directly on a body or integrated into a user's clothes or accessories. The wearable device not only is a hardware device, but also implements powerful functions through software support, data interaction and cloud interaction. Generalized wearable intelligent devices include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign monitoring.

In embodiments of the present disclosure, the network device may be a device for communicating with a mobile device, or may be an Access Point (AP) in WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, a network device in the future evolved PLMN network, or a network device in the NTN network.

As an example but not a limitation, in embodiments of the present disclosure, the network device may have a mobile feature. For example, the network device may be a mobile device. In some embodiments, the network device may be a satellite, a balloon station. For example, a satellite may be a low earth orbit (LEO) satellite, a medium earth orbit (MEO) satellite, a geostationary earth orbit (GEO) satellite, a high octagonal orbit (HEO) satellite, etc. In some embodiments, the network device may also be a base station provided on land or in a water area.

In embodiments of the present disclosure, the network device provides services for a cell, and a terminal device communicates with the network device through transmission resources (for example, frequency domain resources, or spectrum resources) used by the cell. The cell may be a cell corresponding to the network device (e.g., a base station), and the cell may belong to a macro base station, or belong to a base station corresponding to a small cell. Here, the small cell may include a metro cell, a micro cell, a pico cell, a femto cell, etc. These small cells have characteristics such as small coverage and low transmit power, and are suitable for providing high-speed data transmission services.

Figure 2:
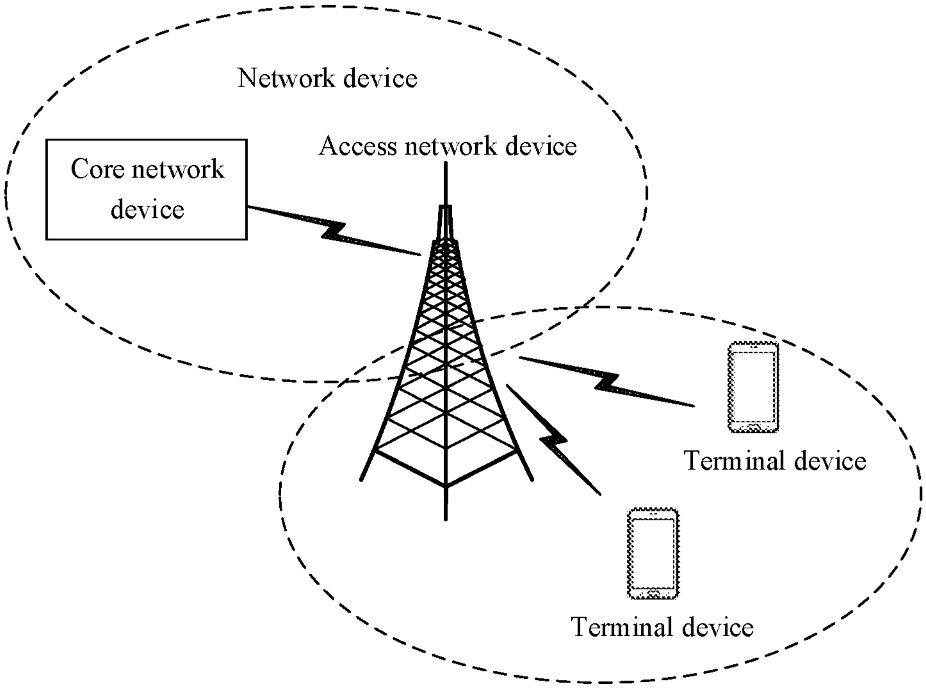
FIG. 2 is a system architecture diagram of a communication system to which embodiments of the present disclosure are applied.

As shown in FIG. 2, it is a system architecture diagram of a communication system to which embodiments of the present disclosure are applied. The communication system may include a network device, and the network device may be a device that communicates with a terminal device (or referred to as a communication terminal or a terminal). The network device can provide communication coverage for a specific geographic area, and can communicate with terminal devices located within the coverage area. FIG. 2 exemplarily shows one network device and two terminal devices. In some embodiments, the communication system may include a plurality of network devices, and the coverage of each network device may include other numbers of terminal devices, which is not limited by embodiments of the present disclosure. In some embodiments, the communication system may further include other network entities, such as a network controller and a mobility management entity, which are not limited by embodiments of the present disclosure.

The network device may also include an access network device and a core network device. That is, the wireless communication system further includes a plurality of core networks for communicating with the access network device. The access network device may be an Evolutional Node B (eNB or e-NodeB for short), a macro base station, a micro base station (also referred to as a "small base station"), a pico base station, an Access Point (AP), or a Transmission Point (TP), or a new generation Node B (gNodeB), etc. in a Long-Term Evolution (LTE) system, a next-generation (mobile communication system) (New Radio (NR) system), or an Authorized Auxiliary Access Long-Term Evolution (LAA-LTE).

It should be understood that, a device having a communication function in a network/system according to embodiments of the present disclosure may be referred to as a communication device. Taking the communication system shown in FIG. 2 as an example, the communication device may include the network device and the terminal device with communication functions, and the network device and the terminal device may be specific devices described in embodiments of the present disclosure, which will not be repeated here. The communication device may also include other devices in the communication system, for example, other network entities such as the network controller and the mobility management entity, which are not limited by embodiments of the present disclosure.

It should be understood that the terms "system" and "network" herein may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "I" herein generally indicates that proceeding and following objects associated thereby are in an "or" relationship.

It should be understood that the "indication" mentioned in embodiments of the present disclosure may be direct indication or indirect indication, and may also means that there is an association relationship. For example, if A indicates B, it can mean that A directly indicates B, for example, B can be obtained through A. Alternatively, it can also mean that A indirectly indicates B, for example, A indicates C, and B can be obtained through C. Further alternatively, it can also mean that there is an association relationship between A and B.

In some embodiments, indication information in embodiments of the present disclosure includes physical layer signaling such as at least one of Downlink Control Information (DCI), Radio Resource Control (RRC) signaling and a Media Access Control-Control Element (MAC CE).

In some embodiments, a scenario to which embodiments of the present disclosure are applied may include a scenario in which terminal devices are in a direction connection.

In the description of embodiments of the present disclosure, the term "corresponding" may mean that there is a direct or indirect correspondence between two items, or may mean that there is an association relationship between the two items, or may also mean that there is an indicating-and-indicated relationship or a configuring-and-configured relationship between the two items.

In order to facilitate the understanding of the technical solutions in embodiments of the present disclosure, the art related to embodiments of the present disclosure is described below. The following related art as optional solutions can be arbitrarily combined with the technical solutions in embodiments of the present disclosure, which all fall within the protection scope of embodiments of the present disclosure. Embodiments of the present disclosure include at least part of the following contents.

Figure 3:
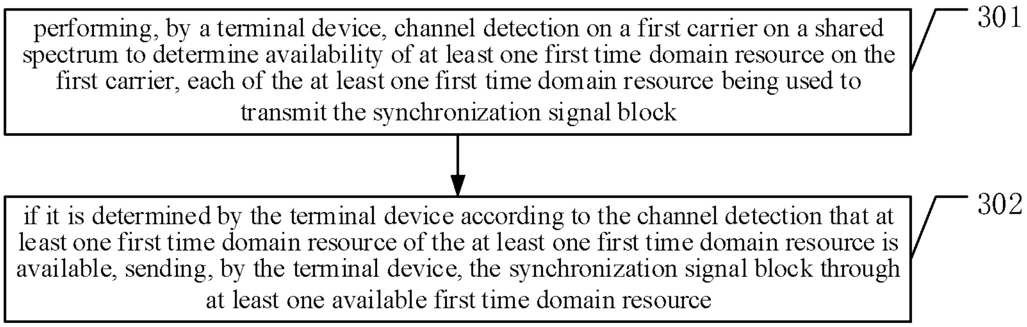
FIG. 3 is a schematic diagram of a method for transmitting a Synchronization Signal Block (SSB) according to embodiments of the present disclosure.

As shown in FIG. 3, it is a schematic diagram of a method for transmitting a Synchronization Signal Block (SSB) according to embodiments of the present disclosure. The method may include 301 and 302.

In 301, a terminal device performs channel detection on a first carrier on a shared spectrum to determine availability of at least one first time domain resource on the first carrier. Each of the at least one first time domain resource is used to transmit the synchronization signal block.

It can be understood that the first time domain resource include a SSB resource. In some embodiments, the SSB resource includes a S-SSB resource.

It can be understood that the terminal device perform the channel detection on the first carrier on the shared spectrum by using a first channel access mode. In some embodiments, the first channel access mode includes at least one of a Type1 channel access mode, a Type2A channel access mode, a Type2B channel access mode, and a Type2C channel access mode.

The performing, by the terminal device, the channel detection on the first carrier on the shared spectrum to determine availability of the at least one first time domain resource on the first carrier may include but is not limited to the following cases.

(1) The terminal device perform the channel detection on the first carrier by using the Type1 channel access mode or the Type2A channel access mode to determine availability of a first first time domain resource of the at least one first time domain resource.

(2) In a case where the at least one first time domain resource includes at least two first time domain resources, if the first first time domain resource of the at least one first time domain resource transmits the synchronization signal block, the terminal device perform the channel detection by using at least one of the Type2A channel access mode, the Type2B channel access mode, and the Type2C channel access mode to determine availability of at least one other first time domain resource of the at least one first time domain resource other than the first first time domain resource. In an implementation, if the terminal device obtains a Channel Occupancy Time (COT), for a resource in the COT, a channel access mode with a higher priority can be used, so as to ensure a resource with a higher priority for transmission.

In some embodiments, the first first time domain resource transmitting the synchronization signal block may include: the terminal device transmitting the synchronization signal block through the first first time domain resource, or the terminal device having detected existence of the synchronization signal block through the first first time domain resource. In some embodiments, the synchronization signal block detected by the terminal device through the first first time domain resource may be sent by another terminal device. Or the synchronization signal block detected by the terminal device through the first first time domain resource may be sent by a network device.

(3) In a case where the at least one first time domain resource includes at least two first time domain resources, if the first first time domain resource of the at least one first time domain resource does not transmit the synchronization signal block, the terminal device perform the channel detection by using the Type1 channel access mode or the Type2A channel access mode to determine availability of the at least one other first time domain resource of the at least one first time domain resource other than the first first time domain resource. In an implementation, if the terminal device does not obtain the COT, the Type1 channel access mode or the Type2A channel access mode needs to be used to ensure fairness in the resource usage on the shared spectrum.

In some embodiments, the first first time domain resource not transmitting the synchronization signal block may include: the terminal device does not transmitting the synchronization signal block through the first first time domain resource, and the terminal device having not detected existence of the synchronization signal block through the first first time domain resource.

(4) In a case where the at least one first time domain resource includes at least two first time domain resources, the terminal device performs the channel detection on the first carrier by using at least one of the Type2A channel access mode, the Type2B channel access mode and the Type2C channel access mode to determine availability of at least one other first time domain resource of the at least one first time domain resource other than the first first time domain resource.

In some embodiments, information of the at least one first time domain resource is preset or configured by a first device, and the information of the at least one first time domain resource includes at least one of the time domain position, the frequency domain position and the number of the at least one first time domain resource. This may also expressed as below. The time domain position of the at least one first time domain resource is preset or configured by the first device. Besides or alternatively, the frequency domain position of the at least one first time domain resource is preset or configured by the first device. Furthermore or further alternatively, the number of the at least one first time domain resource is preset or configured by the first device. The first device may include the network device or a controlling terminal device.

In some embodiments, in embodiments of the present disclosure, the configuration of the first device includes that the first device is indicated through indication information.

In some embodiments, the at least one first time domain resource includes at least two first time domain resources. The at least two first time domain resources have the same Quasi Co-Location (QCL) relationship. Or, the at least two first time domain resources are used to transmit synchronization signal blocks with the same QCL relationship, or the at least two first time domain resources are used to transmit synchronization signal blocks with the same index. In an implementation, a plurality of transmission opportunities are provided for the SSB transmission, which can improve the probability for the terminal device sending the SSB.

In some embodiments, the at least one first time domain resource includes at least two first time domain resources. The at least two first time domain resources do not have the same QCL relationship. Or, the at least two first time domain resources are used to transmit synchronization signal blocks without the same QCL relationship, or the at least two first time domain resources are used to transmit synchronization signal blocks without the same index. Alternatively, when a receiving device receives the SSB through the at least two first time domain resources, it is assumed that the SSBs transmitted on the at least two first time domain resources do not have the same QCL relationship. In an implementation, different SSB resources are used to transmit SSBs in different directions, which can improve the probability for the terminal devices in different directions receiving the SSBs.

It should be noted that having the same QCL relationship can be regarded as having the same beam direction, and the synchronization signal blocks with the same index refer to SSBs with the same SSB index.

In some embodiments, the at least one first time domain resource includes at least two first time domain resources. (1) At least two adjacent first time domain resources included in the at least two first time domain resources are consecutive in time domain. It can be understood that SSB resources in each slot are consecutive, but SSB resources in different slots may be spaced apart by an integer number of symbols.

Alternatively, (2) a first interval in time domain between two adjacent first time domain resources of the at least two first time domain resources includes N symbols, where N is a positive integer. It can be understood that the first interval corresponding to the two adjacent first time domain resources may be the same as or different from the first interval corresponding to another two adjacent first time domain resources. For example, the at least two first time domain resources include SSB resource 0, SSB resource 1, SSB resource 2, and SSB resource 3. SSB resource 0 and SSB resource 1 are spaced apart by one symbol. SSB resource 1 and SSB resource 2 are spaced apart by two symbols. SSB resource 2 and SSB resource 3 are spaced apart by one symbol. In some embodiments, the value of N is determined according to a subcarrier spacing of the synchronization signal block. In some embodiments, the N symbols are used by the terminal device to perform channel access using at least one of the Type2A channel access mode, the Type2B channel access mode, and the Type2C channel access mode. Or, the N symbols are used by the terminal device to perform receiving-to-transmitting conversion or transmitting-to-receiving conversion.

Example 1: if the subcarrier interval corresponding to the synchronization signal block is 15 kHz or 30 kHz, the value of N is 1, and the first interval includes about 72 microseconds (for example, corresponding to 15 kHz) or 36 microseconds (for example, corresponding to 30 kHz), then the terminal device can perform the Type2A channel access mode, the Type2B channel access mode, or the Type2C channel access mode with the first interval for the channel detection, or the terminal device may complete the receiving-to-transmitting conversion or transmitting-to-receiving conversion with the first interval.

Example 2: if the subcarrier spacing corresponding to the synchronization signal block is 60 kHz, the value of N is 1 or 2.

For example, the value of N is 2, and the first interval includes about 36 microseconds. Then, the terminal device can perform the Type2A channel access mode, the Type2B channel access mode or the Type2C channel access mode with the first interval for the channel detection, or the terminal device may complete the receiving-to-transmitting conversion or transmitting-to-receiving conversion with the first interval.

For example, the value of N is 1, and the first interval includes about 18 microseconds. Then, the terminal device can perform the Type2B channel access mode or the Type2C channel access mode with the first interval for the channel detection, or the terminal device may complete the receiving-to-transmitting conversion or transmitting-to-receiving conversion with the first interval.

Example 3: if the subcarrier spacing corresponding to the synchronization signal block is 120 kHz, the value of N is 1 or 2 or 3.

For example, the value of N is 3, and the first interval includes about 27 microseconds. Then, the terminal device can perform the Type2A channel access mode, the Type2B channel access mode or the Type2C channel access mode with the first interval for the channel detection, or the terminal device may complete the receiving-to-transmitting conversion or transmitting-to-receiving conversion with the first interval.

For example, the value of N is 2, and the first interval includes about 18 microseconds. Then, the terminal device can perform the Type2B channel access mode or the Type2C channel access mode with the first interval for the channel detection, or the terminal device may complete the receiving-to-transmitting conversion or transmitting-to-receiving conversion with the first interval.

For example, the value of N is 1, and the first interval includes about 9 microseconds. Then, the terminal device can perform the Type2C channel access mode with the first interval for the channel detection, or the terminal device may complete the receiving-to-transmitting conversion or transmitting-to-receiving conversion with the first interval.

Alternatively, (3) a second interval in time domain between two adjacent first time domain resources of the at least two first time domain resources includes M slots, where M is a positive integer. It can be understood that the second interval corresponding to two adjacent first time domain resources may be the same as or different from the second interval corresponding to another two adjacent first time domain resources. For example, the at least two first time domain resources include SSB resource 0, SSB resource 1, SSB resource 2, and SSB resource 3. SSB resource 0 and SSB resource 1 are spaced apart by 0 slot (that is, a slot where SSB resource 0 is located and a slot where SSB resource 1 is located are consecutive in time domain). SSB resource 1 and SSB resource 2 are spaced apart by one slot. SSB resource 2 and SSB resource 3 are spaced apart by 0 slot.

In the following, the at least one time domain resource is described in various cases.

Figure 4A:
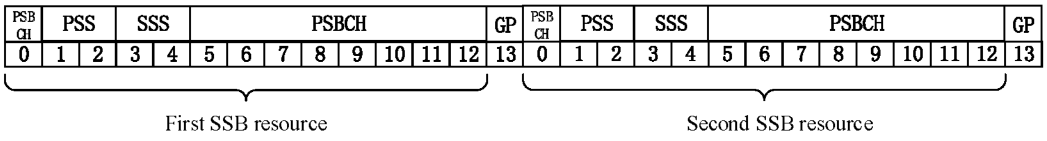
FIG. 4A is a schematic diagram of two consecutive slots each including one first time domain resource according to embodiments of the present disclosure.

Case 1: the at least one first time domain resource is a resource included in at least one slot, and each of the at least one slot includes one first time domain resource. As shown in FIG. 4A, it is a schematic diagram of two consecutive slots each including one first time domain resource according to embodiments of the present disclosure.

For symbols in a slot occupied by the first time domain resource in time domain, the following implementations may be possible.

(1) The first time domain resource occupies symbols 0 to 12 in a slot in time domain.

(2) The first time domain resource occupies symbols 1 to 13 in a slot in time domain.

(3) The first time domain resource occupies symbols 1 to 12 in a slot in time domain.

In some embodiments, if the first time domain resource does not occupy symbol 0 in a slot in time domain, the symbol 0 is used to repeatedly transmit symbol 1, or the symbol 0 is used to transmit a Cyclic Prefix (CP) extension part of the symbol 1, or the symbol 0 is used by the terminal device to perform Automatic Gain Control (AGC) adjustment.

In some embodiments, if the first time domain resource does not occupy symbol 13 in a slot in time domain, the symbol 13 is used to transmit a Cyclic Prefix (CP) extension part of symbol 0 in the next slot, or the symbol 13 is used by the terminal device to perform Automatic Gain Control (AGC) adjustment, or the symbol 13 is used by the terminal device to perform receiving-to-transmitting conversion or transmitting-to-receiving conversion.

Case 2: the at least one first time domain resource is a resource included in at least one slot, and each of the at least one slot includes P first time domain resources, where P is a positive integer greater than or equal to 2.

Figure 4B:
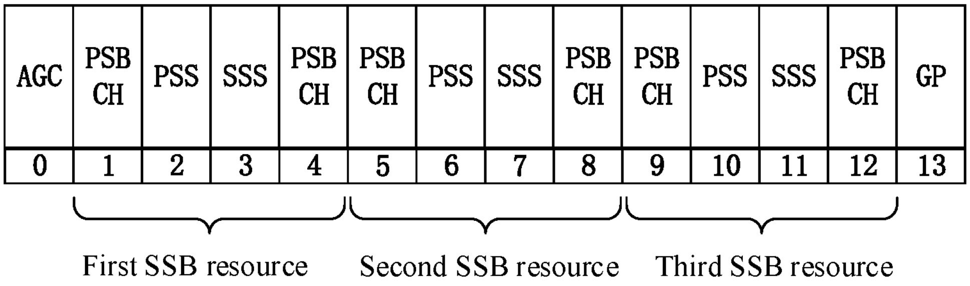
FIG. 4B is a schematic diagram of two adjacent first time domain resources in P first time domain resources being consecutive in time domain according to embodiments of the present disclosure.

In some embodiments, two adjacent first time domain resources of the P first time domain resources are consecutive in time domain. As shown in FIG. 4B, it is a schematic diagram of two adjacent first time domain resources in P first time domain resources being consecutive in time domain according to embodiments of the present disclosure. As shown in FIG. 4B, one slot includes 3 SSBs, and each SSB includes 4 symbols.

Figure 4C:
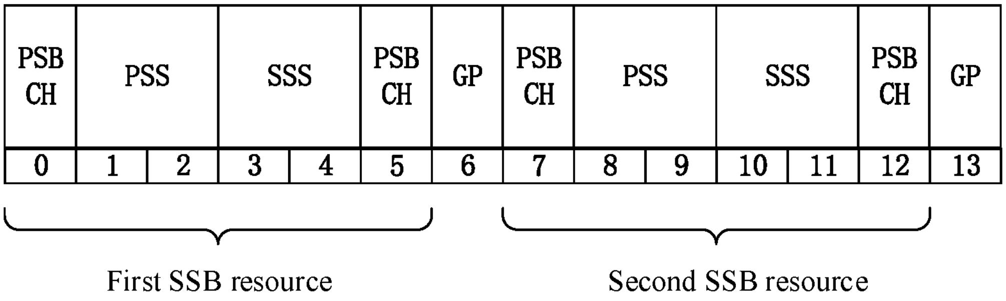
FIG. 4C is a schematic diagram of a third interval in time domain between two adjacent first time domain resources in P first time domain resources including Q symbols according to embodiments of the present disclosure.
Figure 4D:
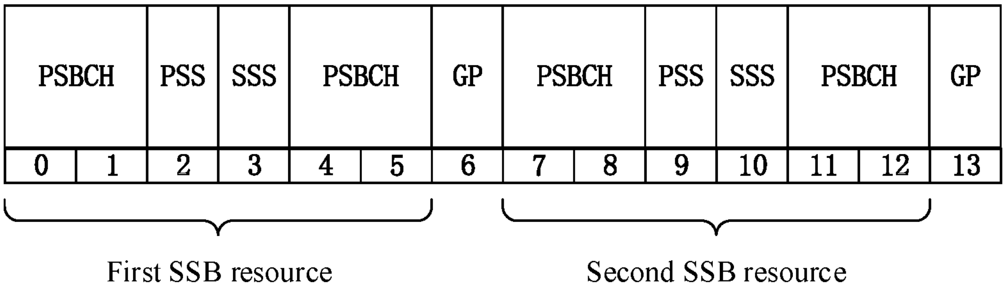
FIG. 4D is another schematic diagram of a third interval in time domain between two adjacent first time domain resources in P first time domain resources including Q symbols according to embodiments of the present disclosure.

In some embodiments, a third interval in time domain between two adjacent first time domain resources of the P first time domain resources includes Q symbols, where Q is a positive integer. As shown in FIGS. 4C and 4D, they are schematic diagrams of a third interval between two adjacent first time domain resources of P first time domain resources including Q symbols in time domain according to embodiments of the present disclosure.

In some embodiments, the Q symbols are used by the terminal device to perform channel access using at least one of the Type2A channel access mode, the Type2B channel access mode, and the Type2C channel access mode. Or, the N symbols are used by the terminal device to perform receiving-to-transmitting conversion or transmitting-to-receiving conversion.

In some embodiments, the Q symbols are used by the terminal device to transmit a Cyclic Prefix (CP) extension part of a first symbol after the Q symbols, so as to ensure that the GAP in the Q symbols satisfies the requirement corresponding to the channel access mode.

Case 3: the at least one first time domain resource is a resource included in at least one slot, and a pattern of the first time domain resource included in each of the at least one slot is the same as a pattern of a synchronization signal block supported by FR1. Alternatively, the pattern of the first time domain resource included in each of the at least one slot is the same as a pattern of a synchronization signal block supported by FR2.

In 302, in a case where the terminal device determines according to the channel detection that at least one first time domain resource of the at least one first time domain resource is available, the terminal device sends the synchronization signal block through the at least one available first time domain resource.

In some embodiments, the sending, by the terminal device, the synchronization signal block through the at least one available first time domain resource may include but is not limited to the following implementations. (1) the terminal device sends the synchronization signal block on each of the at least one available first time domain resource. Or, (2) the terminal device sends the synchronization signal block on one of the at least one available first time domain resource. Or (3) in a case where the at least one available first time domain resource includes S available first time domain resources, the terminal device sends S synchronization signal blocks on the S available first time domain resources. At least two of the S synchronization signal blocks do not have the same QCL relationship, where S is an integer greater than or equal to 2. It should be noted that step 302 is an optional step.

In some embodiments, the synchronization signal block includes at least one of a primary synchronization signal, a secondary synchronization signal, and a physical broadcast channel.

In some embodiments, the primary synchronization signal includes a Sidelink Primary Synchronization Signal (S-PSS), the secondary synchronization signal includes a Sidelink Secondary Synchronization Signal (S-SSS), and the physical broadcast channel includes a Physical Sidelink Broadcast Channel (PSBCH).

Figure 4E:
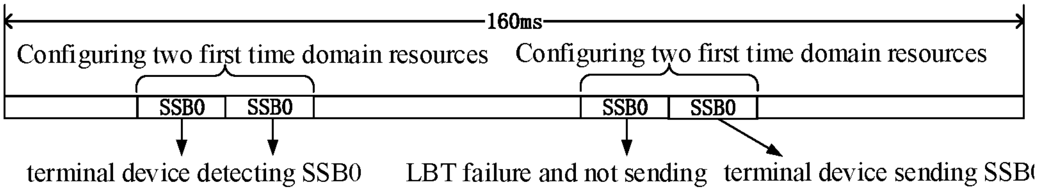
FIG. 4E is a schematic diagram of two groups of SSB resources being included in a synchronization signal transmission period according to embodiments of the present disclosure.
Figure 4F:
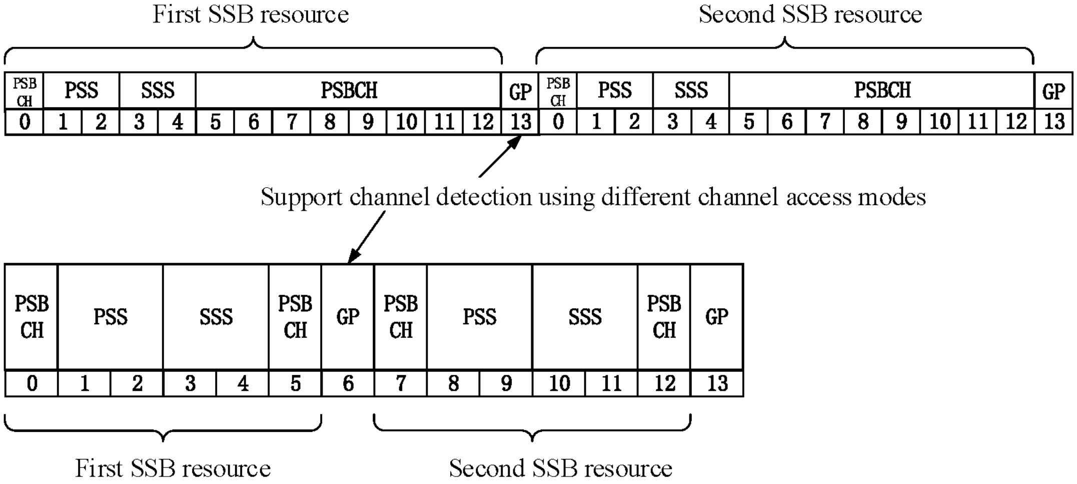
FIG. 4F is a schematic diagram of each group of SSB resources in a synchronization signal transmission period according to embodiments of the present disclosure.

The technical solutions of the present disclosure are described below by way of example. As shown in FIG. 4E, it is a schematic diagram of two groups of SSB resources included in a synchronization signal transmission period according to embodiments of the present disclosure. As shown in FIG. 4F, it is a schematic diagram of each group of SSB resources in a synchronization signal transmission period according to embodiments of the present disclosure. As shown in FIGS. 4E and 4F, on the first carrier, it is assumed that the terminal device in the system needs to transmit one SSB, such as one S-SSB0. Two groups of SSB resources are included in the synchronization signal transmission period, where one group of SSB resources is used by the terminal device to detect SSB0, and the other group of SSB resources is used by the terminal device to send SSB0. Each group of SSB resources includes L=2 SSB resources. The two SSB resources are located in two consecutive slots in time domain, and an interval between the two SSB resources is 1 symbol.

The terminal device detects SSB0 on one group of SSB resources, and performs the channel detection on the first carrier. When the terminal device determines that at least one SSB resource in the other group of SSB resources is available, it sends SSB0 through at least one SSB resource in the available SSB resources.

When performing the channel access, the terminal device may use the Type2A channel access mode for the channel detection so as to determine availability of the first SSB resource. For the second SSB resource, the terminal device may use at least one of the Type2A channel access mode, the Type2B channel access mode, and the Type2C channel access mode for the channel detection so as to determine availability of the second SSB resource.

When the terminal device sends SSB, it can determine that a starting position of the first SSB resource is the boundary of a first symbol (such as symbol 0) of the first SSB resource, and a starting position of the second SSB resource is located in a symbol (such as symbol r) previous to a first symbol of the second SSB resource. An interval between the starting position in the symbol r and the starting position of the symbol r is a fourth interval, and a length of the fourth interval is a preset value, or the length of the fourth interval is associated with the channel access mode.

For example, the second SSB resource corresponds to the Type2A channel access mode, and a length of the third interval is equal to 25 microseconds.

For example, the second SSB resource corresponds to the Type2B channel access mode, and the length of the third interval is equal to 16 microseconds.

For example, the second SSB resource corresponds to the Type2C channel access mode, and the length of the third interval is less than or equal to 16 microseconds.

In some embodiments, with reference to FIG. 4F, a channel access mode corresponding to a GP symbol may include at least one of the following cases.

Case 1: the GP symbol corresponds to the Type2A channel access mode.

Exemplarily, it is assumed that there are two terminal devices, UE0 and UE1, both of which need to send SSB on the same two SSB resources. After UE0 succeeds in LBT on a first SSB resource of the two SSB resources, it can use the Type2A channel access mode to perform LBT after sending the SSB on the first SSB resource, so as to determine the availability of the second SSB resource, that is to determine whether the second SSB resource can be used to send the SSB. In other words, for UE0, the channel access mode corresponding to the second SSB resource is the Type2A channel access mode. After the UE1 fails in LBT on the first SSB resource of the two SSB resources, it can also use the Type2A channel access mode to perform LBT on the channel, and send the SSB through the second SSB resource after the successful LBT.

Case 2: the GP symbol corresponds to the Type2B channel access mode.

Exemplarily, it is assumed that there are two terminal devices, UE0 and UE1, both of which need to send SSB on the same two SSB resources. After UE0 succeeds in LBT on the first SSB resource of the two SSB resources, it can use the Type2B channel access mode to perform LBT after sending the SSB on the first SSB resource, so as to determine the availability of the second SSB resource, that is to determine whether the second SSB resource can be used to send the SSB. In other words, for UE0, the channel access mode corresponding to the second SSB resource is the Type2B channel access mode. After the UE1 fails in LBT on the first SSB resource of the two SSB resources, it can still use the Type2B channel access mode to perform LBT on the channel, and send the SSB through the second SSB resource after the successful LBT.

Case 3: the GP symbol corresponds to the Type2C channel access mode.

Exemplarily, it is assumed that there are two terminal devices, UE0 and UE1, both of which need to send the SSB on the same two SSB resources. After UE0 succeeds in LBT on the first SSB resource of the two SSB resources, it can directly send the SSB through the second SSB resource after an interval (which is less than or equal to 16 microseconds) since UE0 sends the SSB on the first SSB resource. In other words, for UE0, the channel access mode corresponding to the second SSB resource is the Type2C channel access mode. After the UE1 fails in LBT on the first SSB resource of the two SSB resources, if UE1 has detected the SSB on the first SSB resource, it can still use the Type2C channel access mode and send the SSB through the second SSB resource after an interval (which is less than or equal to 16 microseconds) since the end of the first SSB resource.

Case 4: UE0 uses the Type2C channel access mode in the GP symbol, and UE1 uses the Type2B channel access mode in the GP symbol. UE0 sends the SSB on the first SSB resource, and UE1 does not send the SSB on the first SSB resource.

Exemplarily, it is assumed that there are two terminal devices, UE0 and UE1, both of which need to send SSB on the same two SSB resources. After UE0 succeeds in LBT on the first SSB resource of the two SSB resources, it can directly send the SSB through the second SSB resource after an interval of 16 microseconds since UE0 sends the SSB on the first SSB resource. In other words, for UE0, the channel access mode corresponding to the second SSB resource is the Type2C channel access mode. After the UE1 fails in LBT on the first SSB resource of the two SSB resources, it can use the Type2B channel access mode to perform LBT on the channel, and send the SSB through the second SSB resource after the successful LBT.

In some embodiments, in any of the above Cases 1 to 4, if the terminal device needs to start transmission from the middle of the GP symbol, the terminal device can transmit a Cyclic Prefix (CP) extension part of a first symbol in a SSB to be sent in the GP symbol, so as to ensure that the GAP in the GP symbol satisfies the requirement corresponding to the channel access mode.

In some embodiments, the channel access mode corresponding to the GP symbol is preset, or stipulated by the protocol, or indicated by the network device through the indication information, or indicated by a controlling terminal device through the indication information.

In embodiments of the present disclosure, the terminal device performs the channel detection on the first carrier on the shared spectrum to determine availability of at least one first time domain resource on the first carrier. Each of the at least one first time domain resource is used to transmit the synchronization signal block. If the terminal device fails in LBT before one SSB resource, the terminal device can perform LBT for another SSB resource, and perform SSB transmission through the SSB resource after LBT succeeds, thereby improving the transmission opportunity of the SSB.

Figure 5A:
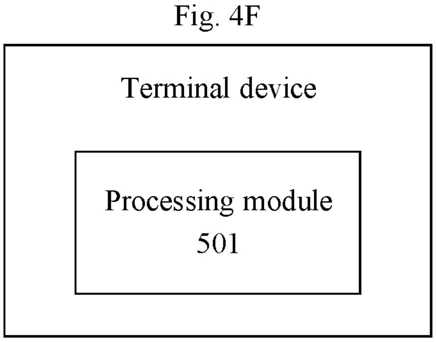
FIG. 5A is a schematic diagram of a terminal device according to embodiments of the present disclosure.

As shown in FIG. 5A, it is a schematic diagram of a terminal device according to embodiments of the present disclosure, and the terminal device may include a processing module 501 and a transceiving module 502.

The processing module 501 is configured to perform channel detection on a first carrier on a shared spectrum to determine availability of at least one first time domain resource on the first carrier. Each of the at least one first time domain resource is used to transmit the synchronization signal block.

In some embodiments, the processing module 501 is specifically configured to perform the channel detection on the first carrier on the shared spectrum by using a first channel access mode. The first channel access mode includes at least one of a Type1 channel access mode, a Type2A channel access mode, a Type2B channel access mode and a Type2C channel access mode.

In some embodiments, the processing module 501 is specifically configured to: if a first first time domain resource of the at least one first time domain resource transmits the synchronization signal block, perform, by the terminal device, the channel detection by using at least one of the Type2A channel access mode, the Type2B channel access mode and the Type2C channel access mode to determine availability of at least one other first time domain resource of the at least one first time domain resource other than the first first time domain resource.

Alternatively, the processing module 501 is specifically configured to: if the first first time domain resource of the at least one first time domain resource does not transmit the synchronization signal block, perform, by the terminal device, the channel detection by using the Type1 channel access mode or the Type2A channel access mode to determine the availability of at least one other first time domain resource of the at least one first time domain resource other than the first first time domain resource.

In some embodiments, the first first time domain resource transmitting the synchronization signal block includes: sending, by the terminal device, the synchronization signal block through the first first time domain resource, or detecting, by the terminal device, existence of the synchronization signal block through the first first time domain resource.

Alternatively, the first first time domain resource not transmitting the synchronization signal block includes: not sending, by the terminal device, the synchronization signal block through the first first time domain resource, and not detecting, by the terminal device, existence of the synchronization signal block through the first first time domain resource.

In some embodiments, the processing module 501 is specifically configured to perform the channel detection on the first carrier by using the Type1 channel access mode or the Type2A channel access mode to determine availability of the first first time domain resource of the at least one first time domain resource.

In some embodiments, the at least one first time domain resource includes at least two first time domain resources.

The processing module 501 is specifically configured to perform the channel detection on the first carrier by using at least one of the Type2A channel access mode, the Type2B channel access mode and the Type2C channel access mode to determine availability of at least one other first time domain resource of the at least one first time domain resource other than the first first time domain resource.

In some embodiments, information of the at least one first time domain resource is preset or configured by a first device, and the information of the at least one first time domain resource includes at least one of the time domain position, the frequency domain position and the number of the at least one first time domain resource.

In some embodiments, the first device includes a network device or a controlling terminal device.

In some embodiments, the at least one first time domain resource includes at least two first time domain resources. The at least two first time domain resources have the same Quasi-Co-Location (QCL) relationship. Alternatively, the at least two first time domain resources are used to transmit synchronization signal blocks with the same QCL relationship, or the at least two first time domain resources are used to transmit synchronization signal blocks with the same index.

In some embodiments, the at least one first time domain resource includes at least two first time domain resources. The at least two first time domain resources do not have the same QCL relationship. Alternatively, the at least two first time domain resources are used to transmit synchronization signal blocks without the same QCL relationship, or the at least two first time domain resources are used to transmit synchronization signal blocks with the same index.

In some embodiments, the at least one first time domain resource includes at least two first time domain resources. At least two adjacent first time domain resources included in the at least two first time domain resources are consecutive in time domain. Or, a first interval in time domain between two adjacent first time domain resources of the at least two first time domain resources includes N symbols, where N is a positive integer. Or, a second interval in time domain between two adjacent first time domain resources of the at least two first time domain resources includes M slots, where M is a positive integer.

In some embodiments, the value of N is determined according to a subcarrier spacing of the synchronization signal block.

In some embodiments, the N symbols are used by the terminal device to perform channel access using at least one of the Type2A channel access mode, the Type2B channel access mode, and the Type2C channel access mode. Alternatively, the N symbols are used by the terminal device to perform receiving-to-transmitting conversion or transmitting-to-receiving conversion.

In some embodiments, the at least one first time domain resource is a resource included in at least one slot, and each of the at least one slot includes one first time domain resource.

In some embodiments, the first time domain resource occupies symbols 0 to 12 in a slot in time domain.

Or, the first time domain resource occupies symbols 1 to 13 in a slot in time domain.

Or, the first time domain resource occupies symbols 1 to 12 in a slot in time domain.

In some embodiments, if the first time domain resource does not occupy symbol 0 in a slot in time domain, then the symbol 0 is used to repeatedly transmit symbol 1; or the symbol 0 is used to transmit a Cyclic Prefix (CP) extension part of the symbol 1; or the symbol 0 is used by the terminal device to perform Automatic Gain Control (AGC) adjustment.

In some embodiments, if the first time domain resource does not occupy symbol 13 in a slot in time domain, then the symbol 13 is used to transmit a Cyclic Prefix (CP) extension part of symbol 0 in the next slot; or the symbol 13 is used by the terminal device to perform the Automatic Gain Control (AGC) adjustment; or the symbol 13 is used by the terminal device to perform the receiving-to-transmitting conversion or transmitting-to-receiving conversion.

In some embodiments, the at least one first time domain resource is a resource included in at least one slot, and each of the at least one slot includes P first time domain resources, where P is a positive integer greater than or equal to 2.

In some embodiments, two adjacent first time domain resources of the P first time domain resources are consecutive in time domain.

In some embodiments, a third interval in time domain between two adjacent first time domain resources of the P first time domain resources includes Q symbols, where Q is a positive integer.

In some embodiments, the Q symbols are used by the terminal device to perform channel access using at least one of the Type2A channel access mode, the Type2B channel access mode, and the Type2C channel access mode. Alternatively, the N symbols are used by the terminal device to perform receiving-to-transmitting conversion or transmitting-to-receiving conversion.

In some embodiments, the Q symbols are used by the terminal device to transmit a Cyclic Prefix (CP) extension part of a first symbol after the Q symbols.

Figure 5B:
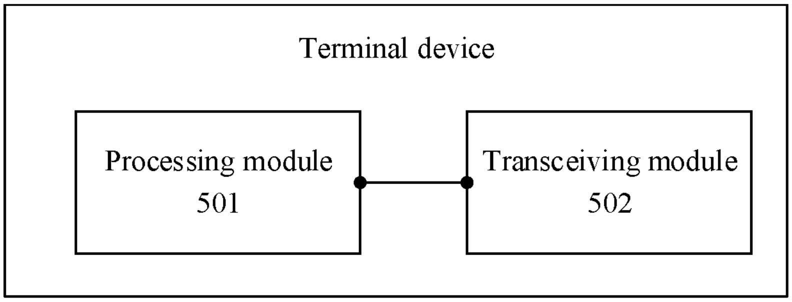
FIG. 5B is a schematic diagram of a terminal device according to embodiments of the present disclosure.

In some embodiments, as shown in FIG. 5B, it is a schematic diagram of a terminal device according to embodiments of the present disclosure. The terminal device further includes a transceiving module 502.

The transceiving module 502 is configured to: if it is determined by the terminal device according to the channel detection that at least one first time domain resource of the at least one first time domain resource is available, send the synchronization signal block through the at least one available first time domain resource.

In some embodiments, the transceiving module 502 is specifically configured to send the synchronization signal block on each of the at least one available first time domain resource.

Alternatively, the transceiving module 502 is specifically configured to send the synchronization signal block on one of the at least one available first time domain resource.

Further alternatively, the transceiving module 502 is specifically configured to: in a case where the at least one available first time domain resource includes S available first time domain resources, send S synchronization signal blocks on the S available first time domain resources. At least two of the S synchronization signal blocks do not have the same QCL relationship, where S is an integer greater than or equal to 2.

In some embodiments, the synchronization signal block includes at least one of a primary synchronization signal, a secondary synchronization signal, and a physical broadcast channel.

Figure 6:
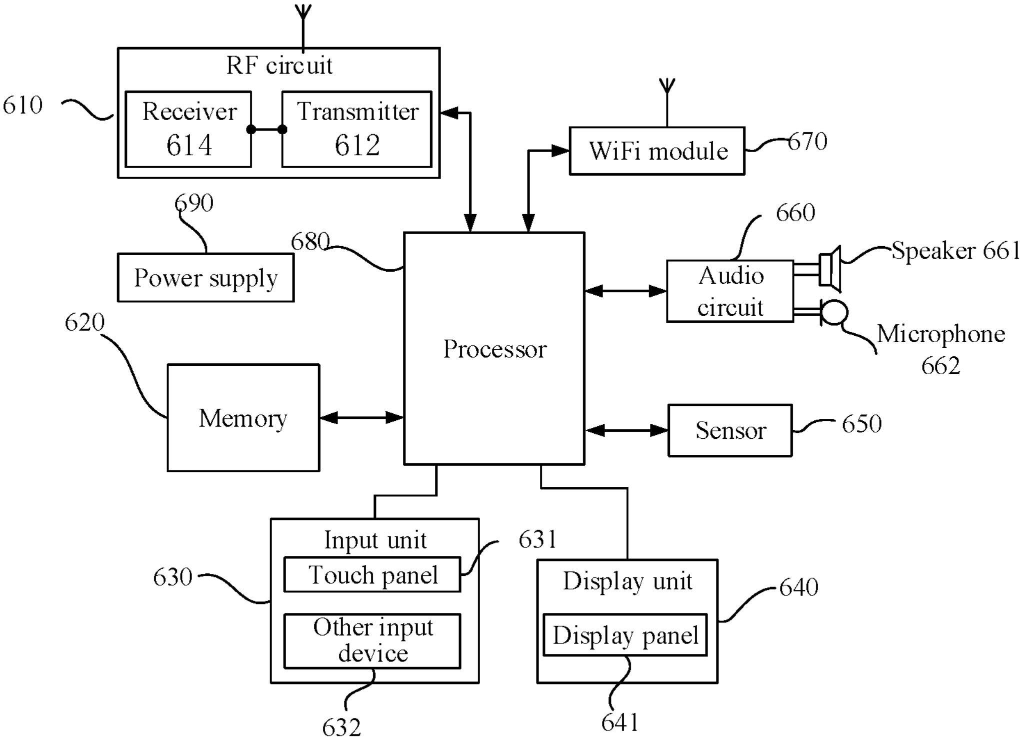
FIG. 6 is a schematic diagram of a terminal device according to embodiments of the present disclosure.

As shown in FIG. 6, it is a schematic diagram of a terminal device according to embodiments of the present disclosure. The terminal device is illustrated by taking a mobile phone as an example. The terminal device may include: a Radio Frequency (RF) circuit 610, a memory 620, an input unit 630, a display unit 640, a sensor 650, an audio circuit 660, a Wireless Fidelity (WiFi) module 670, a processor 680, a power supply 690, and other components. The radio frequency circuit 610 includes a receiver 614 and a transmitter 612. Those skilled in the art can understand that a structure of the mobile phone shown in FIG. 6 does not constitute any limitation on the mobile phone, and more or less components than those shown may be included, or some components may be combined, or different component arrangements may be provided.

In conjunction with FIG. 6, respective components of the mobile phone are introduced in detail as below.

The RF circuit 610 is configured to receive and transmit information, or receive and transmit signals during a call. In particular, the RF circuit 610 is configured to receive downlink information from a base station and transfer the downlink information to the processor 680 for processing. Further, the RF circuit 610 is configured to transmit uplink data to the base station. Generally, the RF circuit 610 includes but is not limited to an antenna, at least one amplifier, a transceiver, a coupler, a Low Noise Amplifier (LNA), a duplexer and the like. In addition, the RF circuit 610 may also communicate with the network and other devices by wireless communication. The above wireless communication may use any communication standard or protocol, which includes but is not limited to Global System Of Mobile Communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and so on.

The memory 620 is configured to store software programs and modules, and the processor 680 is configured to perform various function applications and data processing of the mobile phone by running the software programs and modules stored in the memory 620. The memory 620 mainly includes a program storage area and a data storage area. The program storage area may store an operating system, application programs required for at least one function (for example, a function for playing a sound, a function for playing an image) and so on. The data storage area may store data (for example, audio data, a phone book) created according to use of the mobile phone, and so on. In addition, the memory 620 may include a high-speed RAM, and may further include a non-volatile memory, such as at least one disk storage device, a flash device, or other non-volatile solid storage devices.

The input unit 630 may be configured to receive input digital or character information and generate key signal input associated with user setting and function control of the mobile phone. Specifically, the input unit 630 may include a touch panel 631, and other input devices 632. The touch panel 631, also referred to as a touch screen, may receive a touch operation of the user thereon or nearby (e.g., operation on or near the touch panel 631 by a user using a finger or stylus, or any suitable object or attachment), and drive a corresponding connection device according to a pre-set program. In some embodiments, the touch panel 631 may include a touch detection device and a touch controller. The touch detection device detects the touch orientation of the user and a signal resulted from the touch operation, and transmits the signal to the touch controller. The touch controller receives the touch information from the touch detection device, converts the information into contact coordinates, and sends the contact coordinates to the processor 680. Besides, the touch controller can also receive and perform the command sent by the processor 680. In addition, the touch panel 631 can be realized in various types such as resistive, capacitive, infrared, and surface acoustic waves. In addition to the touch panel 631, the input unit 630 may still include other input devices 632. Specifically, the other input devices 632 may include, but is not limited to, one or more of a physical keyboard, function keys (such as volume control buttons, switch buttons and so on), a trackball, a mouse, and a joystick.

The display unit 640 is configured to display information input by the user, information provided for the user, or various menus of the mobile phone. The display unit 640 may include a display panel 641. Alternatively, the display panel 641 may be in the form of a Liquid Crystal Display (LCD), an Organic Light-Emitting Diode (OLED) and so on. Furthermore, the touch panel 631 may cover the display panel 641. When the touch panel 631 detects a touch operation thereon or nearby, information of the touch operation can be transmitted to the processor 680 so as to determine the type of the touch event. The processor 680 provides corresponding visual output on the display panel 641 according to the type of the touch event. Although in FIG. 6, the touch panel 631 and the display panel 641 are used as two separate components to realize the input and output functions of the mobile phone, in some implementations, the touch panel 631 may be integrated with the display panel 641 to implement the input and output functions of the mobile phone.

The mobile phone may also include at least one sensor 650, such as a light sensor, a motion sensor, and other sensors. Specifically, the light sensor may include an ambient light sensor and a proximity sensor. The ambient light sensor may adjust the brightness of the display panel 641 according to ambient lights. The proximity sensor may turn off the display panel 641 and/or backlight when the mobile phone reaches nearby the ear. As a kind of motion sensor, the accelerometer sensor can detect the magnitude of acceleration in all directions (typically three axes). When the mobile phone is stationary, the accelerometer sensor can detect the magnitude and direction of gravity. The accelerometer sensor can also be used for mobile-phone gestures related applications (such as vertical and horizontal screen switch, related games, magnetometer attitude calibration). Or, the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, which will not be repeated herein.

The audio circuit 660, the speaker 661 and the microphone 662 may provide an audio interface between the user and the mobile phone. The audio circuit 660 may convert the received audio data into electrical signals, and transfer the electrical signals to the speaker 661. Thereafter, the speaker 661 converts the electrical signals into sound signals to output. On the other hand, the microphone 662 converts the received sound signals into electrical signals, which are received and converted into audio data by the audio circuit 660 to output. The audio data is then processed and transmitted by the processor 680 via an RF circuit 610 to another mobile phone for example. Or, the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media and the like. Wi-Fi provides users with wireless broadband Internet access. Although the Wi-Fi module 670 is illustrated in FIG. 6, it can be understood that the Wi-Fi module 670 is not essential to the mobile phone and can be omitted according to actual needs, without departing from the essential nature of the present disclosure.

The processor 680 is the control center of the mobile phone, which connects various parts of the whole mobile phone through various interfaces and lines, runs or performs software programs and/or modules stored in the memory 620, and invokes data stored in the memory 620 to perform various functions of the mobile phone and process data, thereby monitoring the mobile phone as a whole. In some embodiments, the processor 680 may include one or more processing units. For example, the processor 680 may integrate an application processor and a modem processor. The application processor handles the operating system, the user interface, the application, and so on. The modem processor mainly processes wireless communication. It can be understood that the above-mentioned modem processor may not be integrated into the processor 680.

The mobile phone also includes a power supply 690 (e.g., a battery) that supplies power to various components. Preferably, the power supply may be logically connected to the processor 680 via a power management system to enable management of charging, discharging, and power consumption through the power management system. Although not illustrated, the mobile phone may further include a camera, a Bluetooth® module, and so on, which will not be repeated herein.

It should be noted that, in embodiments of the present disclosure, the processor 680 is configured to perform channel detection on a first carrier on a shared spectrum to determine availability of at least one first time domain resource on the first carrier, and each of the at least one first time domain resource is used to transmit the synchronization signal block.

In some embodiments, the processor 680 is specifically configured to perform the channel detection on the first carrier on the shared spectrum by using a first channel access mode. The first channel access mode includes at least one of a Type1 channel access mode, a Type2A channel access mode, a Type2B channel access mode and a Type2C channel access mode.

In some embodiments, the processor 680 is specifically configured to: if a first first time domain resource of the at least one first time domain resource transmits the synchronization signal block, perform, by the terminal device, the channel detection by using at least one of the Type2A channel access mode, the Type2B channel access mode and the Type2C channel access mode to determine availability of at least one other first time domain resource of the at least one first time domain resource other than the first first time domain resource.

Alternatively, the processor 680 is specifically configured to: if the first first time domain resource of the at least one first time domain resource does not transmit the synchronization signal block, perform, by the terminal device, the channel detection by using the Type1 channel access mode or the Type2A channel access mode to determine availability of at least one other first time domain resource of the at least one first time domain resource other than the first first time domain resource.

In some embodiments, the first first time domain resource transmitting the synchronization signal block includes: sending, by the terminal device, the synchronization signal block through the first first time domain resource, or detecting, by the terminal device, existence of the synchronization signal block through the first first time domain resource.

Alternatively, the first first time domain resource not transmitting the synchronization signal block includes: not sending, by the terminal device, the synchronization signal block through the first first time domain resource, and not detected, by the terminal device, existence of the synchronization signal block through the first first time domain resource.

In some embodiments, the processor 680 is specifically configured to perform the channel detection on the first carrier by using the Type1 channel access mode or the Type2A channel access mode to determine availability of a first first time domain resource of the at least one first time domain resource.

In some embodiments, the at least one first time domain resource includes at least two first time domain resources.

The processor 680 is specifically configured to perform the channel detection on the first carrier by using at least one of the Type2A channel access mode, the Type2B channel access mode and the Type2C channel access mode to determine availability of at least one other first time domain resource of the at least one first time domain resource other than the first first time domain resource.

In some embodiments, information of the at least one first time domain resource is preset or configured by a first device, and the information of the at least one first time domain resource includes at least one of the time domain position, the frequency domain position and the number of the at least one first time domain resource.

In some embodiments, the first device includes a network device or a controlling terminal device.

In some embodiments, the at least one first time domain resource includes at least two first time domain resources. The at least two first time domain resources have the same Quasi-Co-Location (QCL) relationship. Alternatively, the at least two first time domain resources are used to transmit synchronization signal blocks with the same QCL relationship, or the at least two first time domain resources are used to transmit synchronization signal blocks with the same index.

In some embodiments, the at least one first time domain resource includes at least two first time domain resources. The at least two first time domain resources do not have the same QCL relationship. Alternatively, the at least two first time domain resources are used to transmit synchronization signal blocks without the same QCL relationship, or the at least two first time domain resources are used to transmit synchronization signal blocks with the same index.

In some embodiments, the at least one first time domain resource includes at least two first time domain resources. At least two adjacent first time domain resources included in the at least two first time domain resources are consecutive in time domain. Alternatively, a first interval in time domain between two adjacent first time domain resources of the at least two first time domain resources includes N symbols, where N is a positive integer. Or, a second interval in time domain between two adjacent first time domain resources of the at least two first time domain resources includes M slots, where M is a positive integer.

In some embodiments, the value of N is determined according to a subcarrier spacing of the synchronization signal block.

In some embodiments, the N symbols are used by the terminal device to perform channel access using at least one of the Type2A channel access mode, the Type2B channel access mode, and the Type2C channel access mode. Or, the N symbols are used by the terminal device to perform receiving-to-transmitting conversion or transmitting-to-receiving conversion.

In some embodiments, the at least one first time domain resource is a resource included in at least one slot, and each of the at least one slot includes one first time domain resource.

In some embodiments, the first time domain resource occupies symbols 0 to 12 in a slot in time domain.

Alternatively, the first time domain resource occupies symbols 1 to 13 in a slot in time domain.

Alternatively, the first time domain resource occupies symbols 1 to 12 in a slot in time domain.

In some embodiments, if the first time domain resource does not occupy symbol 0 in a slot in time domain, then the symbol 0 is used to repeatedly transmit symbol 1; or the symbol 0 is used to transmit a Cyclic Prefix (CP) extension part of the symbol 1; or the symbol 0 is used by the terminal device to perform Automatic Gain Control (AGC) adjustment.

In some embodiments, if the first time domain resource does not occupy symbol 13 in a slot in time domain, then the symbol 13 is used to transmit a Cyclic Prefix (CP) extension part of symbol 0 in the next slot; or the symbol 13 is used by the terminal device to perform the Automatic Gain Control (AGC) adjustment; or the symbol 13 is used by the terminal device to perform the receiving-to-transmitting conversion or transmitting-to-receiving conversion.

In some embodiments, the at least one first time domain resource is a resource included in at least one slot, and each of the at least one slot includes P first time domain resources, where P is a positive integer greater than or equal to 2.

In some embodiments, two adjacent first time domain resources of the P first time domain resources are consecutive in time domain.

In some embodiments, a third interval in time domain between two adjacent first time domain resources of the P first time domain resources includes Q symbols, where Q is a positive integer.

In some embodiments, the Q symbols are used by the terminal device to perform the channel access using at least one of the Type2A channel access mode, the Type2B channel access mode, and the Type2C channel access mode. Or, the N symbols are used by the terminal device to perform the receiving-to-transmitting conversion or transmitting-to-receiving conversion.

In some embodiments, the Q symbols are used by the terminal device to transmit a Cyclic Prefix (CP) extension part of a first symbol after the Q symbols.

In some embodiments, the RF circuit 610 is configured to: if it is determined by the terminal device according to the channel detection that at least one first time domain resource of the at least one first time domain resource is available, send the synchronization signal block through at least one available first time domain resource.

In some embodiments, the RF circuit 610 is specifically configured to send the synchronization signal block on each of the at least one available first time domain resource.

Or, the RF circuit 610 is specifically configured to send the synchronization signal block on one of the at least one available first time domain resource.

Or, the RF circuit 610 is specifically configured to: in a case where the at least one available first time domain resource includes S available first time domain resources, send S synchronization signal blocks on the S available first time domain resources. At least two of the S synchronization signal blocks do not have the same QCL relationship, where S is an integer greater than or equal to 2.

In some embodiments, the synchronization signal block includes at least one of a primary synchronization signal, a secondary synchronization signal, and a physical broadcast channel.

The above-mentioned embodiments may be all or partially implemented by hardware, software, firmware, or any combination thereof. When being implemented by software, the functions may be all or partially implemented in form of computer program products. The computer program products include one or more computer instructions. When the computer program instructions are loaded and performed on a computer, the processes or functions described according to embodiments of the present disclosure are generated in whole or in part. The computer may be a general-purpose computer, a special-purpose computer, a computer network, or other programmable device. The computer instructions may be stored in a computer-readable storage medium, or transferred from one computer-readable storage medium to another computer-readable storage medium. For example, the computer instructions may be transferred from a website site, a computer, a server, or a data center to another website site, computer, server, or data center by wire (e.g., coaxial cable, fiber optic, Digital Subscriber Line (DSL)) or in wireless way (e.g., infrared, wireless, microwave, etc.). The computer-readable storage medium may be any available medium that can be accessed by a computer or a data storage device such as a server, a data center, or the like that includes one or more available mediums. The available medium may be a magnetic medium (e.g., a floppy disk, a hard disk, a magnetic tape), an optical medium (e.g., a Digital Video Disc (DVD)), or a semiconductor medium (e.g. a Solid State Disk (SSD)), etc.

The terms "first", "second", "third", "fourth", etc. (if present) in the specification and claims of the present disclosure and the above drawings are used to distinguish similar objects, and are not configured to describe a particular order or prioritization. It should be understood that the data used in this way can be interchangeable where appropriate, so that embodiments described herein can be practiced in sequences other than those illustrated or described herein. Moreover, the terms "including" and "having" and any variations thereof are intended to cover non-exclusive inclusion. For example, a process, method, system, product or device including a series of steps or units is not necessarily limited to those expressly listed steps or units. Rather, it may include other steps or units not expressly listed or inherent to these processes, methods, products or devices.

What is claimed is:

1. A method for transmitting a Synchronization Signal Block (SSB), comprising:

performing, by a terminal device, channel detection on a first carrier on a shared spectrum by using a first channel access mode to determine availability of at least one first time domain resource on the first carrier, wherein the first channel access mode comprises a Type1 channel access mode and a Type2A channel access mode, wherein the Type1 channel access mode refers to a channel detection mode of a communication device that is multi-detection slot channel detection based on random backoff adjusted according to a contention window size, and the Type2A channel access mode refers to a channel detection mode of the communication device that is to perform channel detection with a fixed detection slot length of 25 microseconds before starting transmission, and wherein each of the at least one first time domain resource is used to transmit the synchronization signal block, wherein the at least one first time domain resource comprises at least two first time domain resources, and the at least two first time domain resources are used to transmit synchronization signal blocks with the same index;

a number of the at least two first time domain resources is configured by a first device;

a time domain position of the at least two first time domain resources is configured by the first device, and an interval in time domain between two adjacent first time domain resources of the at least two first time domain resources comprises M slots, where Mis a positive integer; and the performing, by the terminal device, the channel detection on the first carrier on the shared spectrum to determine availability of the at least one first time domain resource on the first carrier comprises:

when a first first time domain resource of the at least one first time domain resource transmits the synchronization signal block, performing, by the terminal device, the channel detection by using the Type2A channel access mode to determine availability of at least one other first time domain resource of the at least one first time domain resource other than the first first time domain resource.

2. The method according to claim 1, wherein the first channel access mode further comprises at least one of a Type2B channel access mode, and a Type2C channel access mode.

3. The method according to claim 2, wherein the performing, by the terminal device, the channel detection on the first carrier on the shared spectrum to determine availability of the at least one first time domain resource on the first carrier further comprises:

when the first first time domain resource of the at least one first time domain resource transmits the synchronization signal block, performing, by the terminal device, the channel detection by using at least one of the Type2B channel access mode and the Type2C channel access mode to determine availability of the at least one other first time domain resource of the at least one first time domain resource other than the first first time domain resource; or when the first first time domain resource of the at least one first time domain resource does not transmit the synchronization signal block, performing, by the terminal device, the channel detection by using the Type1 channel access mode or the Type2A channel access mode to determine availability of at least one other first time domain resource of the at least one first time domain resource other than the first first time domain resource.

4. The method according to claim 3, wherein the first first time domain resource transmitting the synchronization signal block comprises: sending, by the terminal device, the synchronization signal block through the first first time domain resource, or detecting, by the terminal device, existence of the synchronization signal block through the first first time domain resource; or the first first time domain resource not transmitting the synchronization signal block comprises: sending, by the terminal device, the synchronization signal block through the first first time domain resource, and detecting, by the terminal device, existence of the synchronization signal block through the first first time domain resource.

5. The method according to claim 2, wherein the performing, by the terminal device, the channel detection on the first carrier on the shared spectrum to determine availability of the at least one first time domain resource on the first carrier comprises:

performing, by the terminal device, the channel detection on the first carrier by using the Type1 channel access mode or the Type2A channel access mode to determine availability of the first first time domain resource of the at least one first time domain resource.

6. The method according to claim 2, wherein the performing, by the terminal device, the channel detection on the first carrier on the shared spectrum by using the first channel access mode to determine availability of the at least one first time domain resource on the first carrier comprises:

performing, by the terminal device, the channel detection on the first carrier by using at least one of the Type2A channel access mode, the Type2B channel access mode, and the Type2C channel access mode to determine availability of at least one other first time domain resource of the at least one first time domain resource other than the first first time domain resource.

7. The method according to claim 1, wherein information of the at least one first time domain resource is preset or configured by the first device; and the information of the at least one first time domain resource comprises a frequency domain position.

8. The method according to claim 7, wherein the first device comprises a network device or a controlling terminal device.

9. A terminal device, comprising:

a memory, configured to store executable program codes; and a processor, coupled to the memory, wherein the processor is configured to call the executable program codes stored in the memory to perform channel detection on a first carrier on a shared spectrum by using a first channel access mode to determine availability of at least one first time domain resource on the first carrier, wherein the first channel access mode comprises a Type1 channel access mode and a Type2A channel access mode, wherein the Type1 channel access mode refers to a channel detection mode of a communication device that is multi-detection slot channel detection based on random backoff adjusted according to a contention window size, and the Type2A channel access mode refers to a channel detection mode of the communication device that is to perform channel detection with a fixed detection slot length of 25 microseconds before starting transmission, and wherein each of the at least one first time domain resource is used to transmit a synchronization signal block, wherein the at least one first time domain resource comprises at least two first time domain resources, and the at least two first time domain resources are used to transmit synchronization signal blocks with the same index;

a number of the at least two first time domain resources is configured by a first device;

a time domain position of the at least two first time domain resources is configured by the first device, and an interval in time domain between two adjacent first time domain resources of the at least two first time domain resources comprises M slots, where Mis a positive integer; and the processor is further configured to call the executable program codes stored in the memory to:

when a first first time domain resource of the at least one first time domain resource transmits the synchronization signal block, perform the channel detection by using the Type2A channel access mode to determine availability of at least one other first time domain resource of the at least one first time domain resource other than the first first time domain resource.

10. The terminal device according to claim 9, wherein the at least one first time domain resource is a resource comprised in at least one slot, and each of the at least one slot comprises one first time domain resource.

11. The terminal device according to claim 9, wherein the at least one first time domain resource is a resource comprised in at least one slot, and each of the at least one slot comprises P first time domain resources, where P is a positive integer greater than or equal to 2.

12. The terminal device according to claim 9, wherein the terminal device further comprises a transceiver, and the transceiver is configured to: if it is determined by the terminal device according to the channel detection that at least one first time domain resource of the at least one first time domain resource is available, send the synchronization signal block through at least one available first time domain resource.

13. The terminal device according to claim 12, wherein the transceiver is specifically configured to send the synchronization signal block on each of the at least one available first time domain resource; or the transceiver is specifically configured to send the synchronization signal block on one of the at least one available first time domain resource; or the transceiver is specifically configured to: if the at least one available first time domain resource comprises S available first time domain resources, send S synchronization signal blocks on the S available first time domain resources, wherein at least two of the S synchronization signal blocks do not have the same QCL relationship, where S is an integer greater than or equal to 2.

14. The terminal device according to claim 9, wherein the synchronization signal block comprises at least one of a primary synchronization signal, a secondary synchronization signal, and a physical broadcast channel.

15. A non-transitory computer-readable storage medium, comprising instructions, which, when executed by a computer, cause the computer to perform a method for transmitting a Synchronization Signal Block (SSB), comprising:

performing, by a terminal device, channel detection on a first carrier on a shared spectrum by using a first channel access mode to determine availability of at least one first time domain resource on the first carrier, wherein the first channel access mode comprises a Type1 channel access mode and a Type2A channel access mode, wherein the Type1 channel access mode refers to a channel detection mode of a communication device that is multi-detection slot channel detection based on random backoff adjusted according to a contention window size, and the Type2A channel access mode refers to a channel detection mode of the communication device that is to perform channel detection with a fixed detection slot length of 25 microseconds before starting transmission, and wherein each of the at least one first time domain resource is used to transmit the synchronization signal block, wherein the at least one first time domain resource comprises at least two first time domain resources, and the at least two first time domain resources are used to transmit synchronization signal blocks with the same index;

a number of the at least two first time domain resources is configured by a first device;

a time domain position of the at least two first time domain resources is configured by the first device, and an interval in time domain between two adjacent first time domain resources of the at least two first time domain resources comprises M slots, where Mis a positive integer; and the performing, by the terminal device, the channel detection on the first carrier on the shared spectrum to determine availability of the at least one first time domain resource on the first carrier comprises:

when a first first time domain resource of the at least one first time domain resource transmits the synchronization signal block, performing, by the terminal device, the channel detection by using the Type2A channel access mode to determine availability of at least one other first time domain resource of the at least one first time domain resource other than the first first time domain resource.

* * * * *